United States Patent Office 3,535,301
Patented Oct. 20, 1970

3,535,301
PROCESS FOR OBTAINING POWDERS OF POLYTETRAFLUOROETHYLENE
Giovanni Groppelli and Donato Carcano, Milan, Franco Gozzo, Saronno, and Mario Ragazzini, Milan, Italy, assignors to Montecatini Edison S.p.A., Milan, Italy
No Drawing. Filed Dec. 11, 1967, Ser. No. 689,313
Claims priority, application Italy, Dec. 15, 1966, 31,144A/67
Int. Cl. C08f 3/20
U.S. Cl. 260—92.1         6 Claims

ABSTRACT OF THE DISCLOSURE

Polytetrafluoroethylene powders having a high flowability index, are produced by polymerization of $C_2F_4$ in aqueous suspension, at a pH $\geq 7$, in the presence of ammonium or alkali persulphates and silver nitrate, and in the presence of 0.001–1 gr. per liter of used $H_2O$, of polyoxyperfluoromethylenes, at room temperature and under from atmospheric pressure to 15 atmospheres.

BACKGROUND OF THE INVENTION

This invention refers to the polymerization in an aqueous suspension of fluorinated monomers and more particularly it relates to the production of polytetrafluoroethylene in the form of powders having a high degree of flowability. Such a characteristic turns out to be particularly useful in the processes which require the use of molding machines with automatic metering. Polytetrafluoroethylene powders of high flowability were produced by subjecting the polymer obtained according to known polymerization techniques to grinding and to successive long and burdensome post-treatments with the aim of obtaining a rounding off of the single particles that show a filament like and irregular shape which caused the tendency of the material to pack or clog. Another process was also known that allowed a substantial improvement of the flowability index of the polytetrafluoroethylene powders, the process consisting in polymerizing the tetrafluoroethylene and the other ethylenically unsaturated fluorinated monomers in an aqueous suspension at a temperature below 50° C., by contacting the monomer in the liquid or gaseous phase with a catalytic system constituted by an inorganic peroxide, as reaction initiator, and by a watersoluble silver salt, as reaction activator. The polymer thus obtained will be found to be finely dispersed in the aqueous phase, in the form of granules whose sizes will vary with the stirring speed, with the polymerization rate and the weight ratio water-polymer. In the dry state this granular polymer is smooth running and shows a bulk density of around 500 g./litre.

It has now been found surprisingly that it is possible to obtain powders of polytetrafluoroethylene having an even higher degree of flowability, by polymerizing the tetrafluoroethylene in the presence of a particular liquid polymeric compound constituted by a succession of head-tail units (—$CF_2$—O—).

Thus, the object of this invention is to provide a process for the polymerization in an aqueous suspension of tetrafluoroethylene, which will allow the production of polytetrafluoroethylene powders provided with excellent physical and mechanical characteristics and having a flowability index considerably higher than the powders obtained through the processes known so far for the polymerization of tetrafluoroethylene.

These and other objects still are attained by operating according to this invention, which offers important advantages in comparison to those offered by the known processes.

One advantage is that polytetrafluoroethylene can be obtained in the form of a fine powder, having a uniform granulometry and a high flowability, that this powder can be directly fed into the molds or into the hoppers of the extruders without having to be preliminarily screened.

Another advantage of this invention lies in the fact that a polytetrafluoroethylene of a high bulk density is obtained.

Still another advantage of the invention relates to the fact that one obtains a polymer finely dispersed in the aqueous phase of reaction without the formation of polymer foulings on the inside walls of the reactors, even when operating with a water to polymer ratio comprised between 3 and 1.

A further advantage lies in the fact that during cold preforming in the molds, with the powders obtained according to this invention, the filling of the molds, due to the perfect flowability of the powders, is regular and uniform while the subsequent separation from the mold of the formed bodies is clean-cut and perfectly troubless.

A still further advantage of the process according to this invention lies in the fact that it allows the production of powders provided with a degree of flowability at least 20% greater than that of the powders obtained through the known methods.

THE INVENTION

All the above described advantages are obtained according to this invention by polymerizing the tetrafluoroethylene in the presence of a catalytic system constituted by an inorganic peroxide as reaction initiator, and by a water-soluble silver salt as reaction activators, in an aqueous medium having a pH greater than or equal to 7, in the presence of a quantity, comprised between 0.001 and 1 gr. per litre of water, of polyoxyperfluoromethylenes having a molecular weight greater than 1000, liquid at room temperature and having part of the tail groups of acid nature and part of them of neutral nautre, at temperatures comprised between 0° C. and 45° C., but preferably around room temperautre, and under a pressure comprised between atmospheric pressure and 15 atm.

According to one form of embodiment of this invention, into an enamelled steel autoclave provided with a stirrer and a cooling jacket are introduced under stirring, at a temperature comprised between 0° C. and 45° C. and maintained constant throughout the reaction, distilled and deareated water containing borax or any other buffer agent in a quantity sufficient to have a pH greater than or equal to 7, and poly(oxyperfluoromethylenes)

$$(-CF_2-O-)_n$$

in quantities comprised between 0.001 and 1 gr. per litre of water. While continuing to stir, tetrafluoroethylene is introduced into the autoclave until a pressure is reached comprised between the ambient pressure and 15 atm. Thereupon into the autoclave is injected the catalytic system preferably constituted by $(NH_4)_2S_2O_8$ and by $AgNO_3$, which are introduced separately into the autoclave, in the form of aqueous solutions. At this point begins the polymerization of the tetrafluoroethylene and the pressure is kept constant by means of continuous additions of monomer.

At the end of the reaction the polymer is discharged from the bottom, washed for about 5 minutes with water under agitation of a blade stirrer and then dried. The discharge is quantitative and there is no need to wash the reactor before the subsequent charge.

The polymer is obtained with high yields; in the dry state it presents itself in the form of a fine highly flowable powder. The single particles have a round or slightly oblong shape with an average size of about 600 microns and a bulk density comprised between 780 g./litre and 530 g./litre.

The polymer shows a breaking load comprised between 230 kg./cm.$^2$ and 170 kg./cm.$^2$, an elongation comprised between 340% and 180% and a specific weight comprised between 2.17 and 2.14 g./cc. (determined according to ASTM D 1457–62 T standards).

In the process according to this invention the catalytic system is constituted by a reaction initiator consisting of persulphates of ammonium or of alkaline metals, and by a reaction activator constituted by silver nitrate.

The ammonium persulphate or the persulphate of alkaline metals is used in quantities comprised between 2 and 0.1 millimoles per litre, but preferably in quantities around 0.3 millimole per litre of used water. The silver nitrate is present in quantities comprised between 0.3 and 0.02 millimole per litre, but preferably in quantities around 0.05 millimole per litre of used water.

The poly(oxyperfluoromethylenes) are polymeric compounds constituted by a succession of head-tail structural units of the formula —$CF_2$—O—; the mean molecular weight of these compounds is greater than 1000.

The tail groups of these chains are partly consisting of

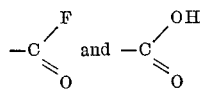

and partly of —$CF_3$ groups.

The quantity of poly(oxyperfluoromethylenes) present in the reaction mixture is comprised between 0.001 and 1 g. per litre, but preferably between 0.01 and 0.4 g. per litre of used water.

The pH of the reaction mixture is not critical; it is greater than or equal to 7; the buffer agents are generally chosen from amongst sodium or ammonium tetraborates or pyrophosphates. Also the reaction temperature is not critical and is comprised between 0° C. and 45° C., but preferably between 10° C. and 30° C.

The pressure at which the polymerization reaction is conducted is comprised between ambient pressure and 15 atm., but preferably between 8 and 10 atm.

In order to better illustrate the invention a number of examples will be given hereinafter. In particular, in order to illustrate the importance of the use of poly(oxyperfluoromethylenes), Example 8 is carried out in the absence of said polymeric compound; the polytetrafluoroethylene powders thereby obtained have a flowability index and a bulk density lower than that of the polytetrafluoroethylene powders obtained in the presence of poly(oxyperfluoromethylenes) as described in the other examples.

EXAMPLE 1

Into an enamelled steel autoclave having a holding capacity of 5 lt. and provided with a stirrer and a cooling jacket, 2.300 lt. of distilled and deaerated water containing 2.5 g. of borax and 0.8 g. of poly(oxyperfluoromethylenes) are introduced under constant stirring, at a temperature of 30° C. While maintaining the stirring a quantity of tetrafluoroethylene is then introduced into the autoclave so as to attain a pressure of 10 atm.

At this point, 100 cc. of an aqueous solution containing 0.125 g. of $(NH_4)_2S_2O_8$ and 100 cc. of an aqueous solution containing 0.015 g. of $AgNO_3$ are fed into the autoclave by means of a metering pump. Immediately thereupon starts the polymerization of the tetrafluoroethylene, and as this goes on, successive additions of monomer are carried out in such a way as to maintain the pressure unchanged in the autoclave.

After about 4 hours the polymer is discharged from the bottom valve of the autoclave and is washed for 5 minutes with water under the action of a blade stirrer, after which it is dried. 810 g. of product of a fine and flowable consistency is obtained, which is formed of roundish or slightly oblong particles having an average size of 600 microns and bulk density of 630 g./litre.

The polymer showed a breaking load of 220 kc./cm.$^2$, an elongation of 290% and a specific weight of 2.160 g./cc. (determined according to ASTM D 1457–62 T standards). In order to get an indicative measure of the molecular weight, the "Zero Strength Time" (ZST) was established on a sample, according to A. Nishioka et al. (Journal of Applied Polymer Science, 2, 114 (1959)); the specimen was obtained from a sintered disc according to ASTM standards, but preformed at 150° C. under a pressure of 350 kg./cm.$^2$ in order to eliminate the influence of porosity.

As indicated by Nishioka (see preceding reference) the molecular weight increased with the growing of the ZST values. The determination carried out at 360° C. by applying a load of 200 g. gave a value of 26 minutes.

The flowability index of the powder equalled 11 g./sec. This value was determined by filling a cylindrical vessel with an inside diameter of 50 mm. a height of 145 mm. and closed on the bottom by a metal net of mesh 10 (Tyler Series), and by then measuring the time required by a determined quantity of powder to cross said net when the apparatus was put into vibration at a frequency of 10 cycles/sec. with a stroke of 10 mm.

EXAMPLES 2–8

By operating as in Example 1, the other examples were carried out according to the invention and the resulting data were listed on the attached table.

TABLE

| | Example No. | | | | | | |
|---|---|---|---|---|---|---|---|
| | 2 | 3 | 4 | 5 | 6 | 7 | 8 |
| Temperature, ° C. | 30 | 20 | 20 | 20 | 20 | 20 | 20 |
| Pressure, atm | 10 | 10 | 8 | 8 | 8 | 8 | 10 |
| $(NH_4)_2S_2O_8$, mg. total | 125 | 125 | 167 | 167 | 167 | 167 | 167 |
| $AgNO_3$, mg. total | 15 | 15 | 21 | 21 | 21 | 21 | 21 |
| Poly(oxyperfluoromethylenes), mg. total | 400 | 500 | 200 | 100 | 50 | 25 | |
| Grams of discharged polymer | 830 | 740 | 760 | 810 | 800 | 790 | 760 |
| Bulk density, g./l | 610 | 590 | 590 | 600 | 580 | 550 | 480 |
| Average size, microns | 610 | 580 | 590 | 580 | 570 | 610 | 600 |
| Flowability index, g./cc. | 10 | 9 | 9 | 8 | 8 | 8 | 6 |
| Specific weight, g./cc. | 2,154 | 2,162 | 2,158 | 2,154 | 2,150 | 2,152 | 2,140 |
| Breaking load, kg./cm.$^2$ | 200 | 220 | 200 | 195 | 190 | 188 | 160 |
| Elongation | 280 | 290 | 280 | 260 | 240 | 237 | 200 |
| ZST, minutes | 26 | 28 | 28 | 31 | 30 | 32 | 26 |

What we claim is:

1. A process for the preparation of polytetrafluoroethylene in the form of powder showing a high flowability index, by means of the polymerization of tetrafluoroethylene in aqueous suspension having a pH greater than or equal to 7, in the presence of a catalytic system constituted by ammonium persulphate or alkaline persulphates and by silver nitrate, characterized in that the polymerization of the tetrafluoroethylene is carried out in the presence of a poly(oxyperfluoromethylene) which has a molecular weight higher than 1000 and is present as a liquid in the reaction mixture in quantities between 0.001 and 1 g. per litre of water, under a pressure between atmospheric pressure and 15 atm. and at a temperature between 0° C. and 45° C.

2. A process according to claim 1, characterized in that the poly(oxyperfluoromethylenes) (—$CF_2$—O—)$_n$ are present in the reaction mixture in quantities between 0.01 and 0.4 g. per litre of water.

3. A process according to claim 1, characterized in that the pressure at which the reaction is conducted is between 8 and 10 atmospheres.

4. A process according to claim 1, characterized in that the reaction temperature is comprised between 10° C. and 30° C.

5. A process according to claim 1, characterized in that the ammonium persulphate is present in the reaction medium in quantities around 0.3 millimole per litre of water.

6. A process according to claim 1, characterized in that the silver nitrate is present in the reaction medium in quantities around 0.05 millimole per litre of water.

References Cited

UNITED STATES PATENTS

| 3,413,276 | 11/1968 | Hoashi et al. | 260—92.1 |
| 3,331,822 | 7/1967 | Rometani et al. | 260—87.5 |
| 3,193,543 | 7/1965 | Ragazzini | 260—92.1 |

MURRAY TILLMAN, Primary Examiner

C. J. SECCURO, Assistant Examiner

U.S. Cl. X.R.

260—29.6, 900